United States Patent
Bulan et al.

(10) Patent No.: US 9,536,315 B2
(45) Date of Patent: Jan. 3, 2017

(54) ANNOTATION FREE LICENSE PLATE RECOGNITION METHOD AND SYSTEM

(71) Applicant: Xerox Corporation, Norwalk, CT (US)

(72) Inventors: Orhan Bulan, Henrietta, NY (US); Vladimir Kozitsky, Rochester, NY (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/658,713

(22) Filed: Mar. 16, 2015

(65) Prior Publication Data
US 2016/0203380 A1    Jul. 14, 2016

Related U.S. Application Data

(60) Provisional application No. 62/102,692, filed on Jan. 13, 2015.

(51) Int. Cl.
*G06K 9/00* (2006.01)
*G06T 7/00* (2006.01)
(Continued)

(52) U.S. Cl.
CPC .......... *G06T 7/0079* (2013.01); *G06K 9/3258* (2013.01); *G06K 9/6256* (2013.01); *G06K 9/6277* (2013.01); *G06K 2209/01* (2013.01)

(58) Field of Classification Search
USPC .................. 382/155–160, 181–231
See application file for complete search history.

(56) References Cited

U.S. PATENT DOCUMENTS 6,473,517 B1    10/2002    Tyan et al.
6,982,654 B2    1/2006    Rau et al.
(Continued)

FOREIGN PATENT DOCUMENTS

EP    2 088 568 A3    3/2013
EP    2595092 A2    5/2013

OTHER PUBLICATIONS

Rodriguez-Serrano et al. "Data-Driven Vehicle Identification by Image Matching" 2012.*
(Continued)

*Primary Examiner* — Alex Liew
(74) *Attorney, Agent, or Firm* — Kermit D. Lopez; Luis M. Ortiz; Ortiz & Lopez, PLLC (57) ABSTRACT

Methods and systems for recognizing a license plate character. Synthetic license plate character images are generated for a target jurisdiction. A limited set of license plate images can be captured for a target jurisdiction utilizing an image-capturing unit. The license plate images are then segmented into license plate character images for the target jurisdiction. The license plate character images collected for the target jurisdiction can be manually labeled. A domain adaptation technique can be utilized to reduce the divergence between synthetically generated and manually labeled target jurisdiction image sets. Additionally, OCR classifiers are trained utilizing the images after the domain adaptation method has been applied. One or more input license plate character images can then be received from the target jurisdiction. Finally, the trained OCR classifier can be employed to determine the most likely labeling for the character image and a confidence associated with the label.

20 Claims, 8 Drawing Sheets

(51) Int. Cl.
*G06K 9/62* (2006.01)
*G06K 9/32* (2006.01)

(56) References Cited

U.S. PATENT DOCUMENTS

| | | | |
|---|---|---|---|
| 7,339,495 | B2 | 3/2008 | Kavner |
| 8,447,112 | B2 | 5/2013 | Paul et al. |
| 8,588,470 | B2 * | 11/2013 | Rodriguez Serrano ............... G06K 9/6217 382/105 |
| 8,798,325 | B2 * | 8/2014 | Wu ........................ G06K 9/00 382/105 |
| 8,811,743 | B2 | 8/2014 | Kapoor et al. |
| 8,855,436 | B2 | 10/2014 | Bulan et al. |
| 8,903,167 | B2 | 12/2014 | Kohli et al. |
| 2004/0234105 | A1 | 11/2004 | Wu et al. |
| 2009/0202105 | A1 | 8/2009 | Castro Abrantes et al. |
| 2012/0128210 | A1 | 5/2012 | Zobel |
| 2012/0148105 | A1 | 6/2012 | Burry et al. |
| 2013/0129151 | A1 * | 5/2013 | Rodriguez Serrano ................... G06K 9/6217 382/105 |
| 2013/0129152 | A1 * | 5/2013 | Rodriguez Serrano ................... G06K 9/6255 382/105 |
| 2014/0056520 | A1 * | 2/2014 | Rodriguez Serrano ................... G06K 9/325 382/174 |
| 2014/0126779 | A1 | 5/2014 | Duda |
| 2014/0348392 | A1 | 11/2014 | Burry et al. |
| 2016/0035037 | A1 * | 2/2016 | Bulan ................... G06Q 40/08 705/4 |

OTHER PUBLICATIONS

Gong, B. et al., "Geodesic Flow Kernel for Unsupervised Domain Adaptation," Computer Vision and Pattern Recognition (CVPR), 2012 IEEE Conference on, 8 pages.

Hoessler, H. et al., "Classifier training based on synthetically generated samples," Proc. 5th International Conference on Computer Vision Systems (2007), 10 pages.

Ni, J. et al., "Subspace Interpolation via Dictionary Learning for Unsupervised Domain Adaptation," Computer Vision and Pattern Recognition (CVPR), 2013 IEEE Conference on, 8 pages.

Bulan, O. et al., Towards Annotation Free License Plate Recognition, 2015 IEEE 18th International Conference on Intelligent Transportation Systems, pp. 1495-1499.

Fernando, B. et al., Unsupervised Visual Domain Adaptation Using Subspace Alignment, Proceedings of the IEEE International Conference on Computer Vision (2013) pp. 2960-2967.

Goplan, R. et al., Domain Adaptation for Object Recognition: An Unsupervised Approach, 2011 International Conference on Computer Vision, pp. 999-1006.

GB Search Report for GB1600476.4 dated Jun. 24, 2016.

* cited by examiner

ANNOTATION FREE LICENSE PLATE RECOGNITION METHOD AND SYSTEM

CROSS-REFERENCE TO PROVISIONAL APPLICATION

This application claims priority under 35 U.S.C. 119(e) to U.S. Provisional Patent Application Ser. No. 62/102,692, entitled "Annotation Free License Plate Recognition Method and System," which was filed on Jan. 13, 2015, the disclosure of which is incorporated herein by reference in its entirety.

TECHNICAL FIELD

Embodiments are generally related to the field of ALPR (Automatic License Plate Recognition). Embodiments also relate to techniques and systems for character identification and extraction from images. Embodiments additionally relate to the field of OCR (Optical Character Recognition).

BACKGROUND OF THE INVENTION

ALPR is a mature technology extensively employed in intelligent transportation systems for applications such as automated tolling, law enforcement, and parking management, among others. These systems typically include four modules: a) image acquisition, b) license plate localization, c) character segmentation (i.e., extracting images of each individual character in the license plate), and d) character recognition. A number of alternative methods, however, have been proposed for license plate recognition.

ALPR methods typically require an offline phase to train an OCR engine before deployment. In this offline phase, a classifier is trained for each character in a one-vs-all fashion using a set of manually annotated character samples. In order to match the distribution of training and target data sets, data collection and manual annotation is repeated for each country/state that font is different, and for each site that camera settings/configuration/geometry varies. Considering enormous variety of plate samples (i.e., variations in plate design, font, or layout), camera configuration, and geometries, manual annotation results in excessive operational cost and overhead and hence, poses an important challenge for the scalability of ALPR systems.

Efforts have been made to develop automated license plate recognition systems and some implementations have been successfully rolled out in some U.S. states (e.g., CA, NY, etc.). One module type employed in some automated license plate recognition systems includes training classifiers for character recognition, commonly employed after detecting a license plate in a license plate image and segmenting out the characters from the localized plate region.

A classifier can be trained for each character in a one vs. all fashion using samples collected from the site, wherein an operator manually labels the collected samples. Considering the high accuracy (i.e., 99%) required by our customers for the overall recognition system, the classifiers are typically trained using on the order of approximately 1000 manually labeled samples per character. The substantial time and effort required for manual annotation of training images can result in excessive operational costs and increased overhead. This problem is exacerbated for jurisdictions requiring multiple OCR engines (e.g., one for each of the most common states), as the annotation burden grows quickly (e.g., 36 symbols×1000 samples×6 jurisdictions=216 k samples to manually label).

Figure 1:
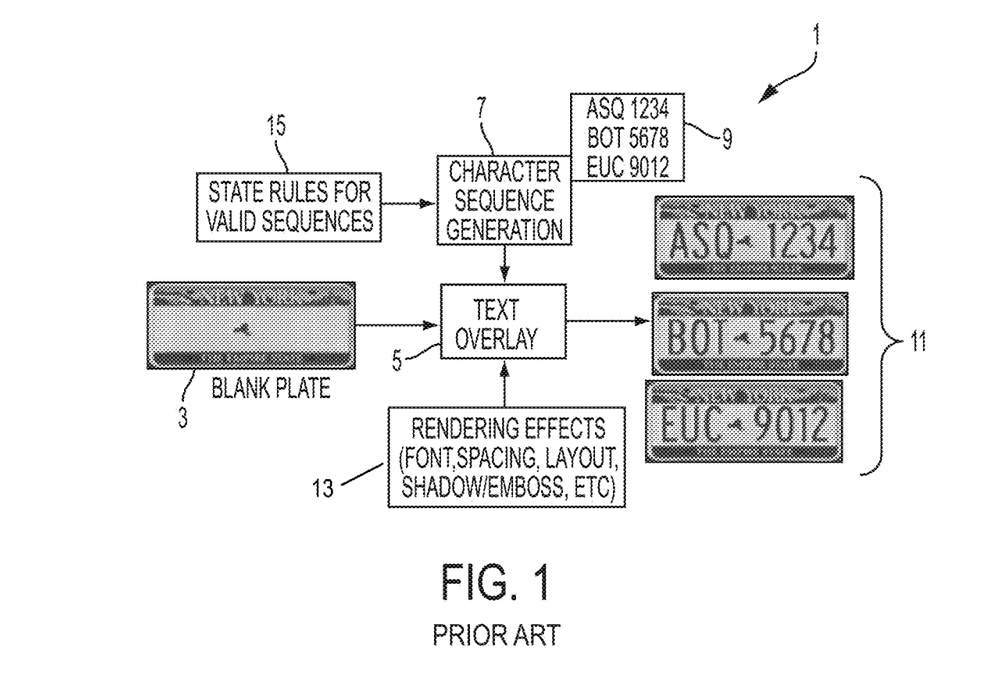
FIG. 1 illustrates a block diagram of a prior art plate synthesis workflow.

In order to address this problem, some solutions have proposed training classifiers based on synthetically generated samples. Instead of collecting samples from the site, training images are synthetically generated using the font and layout of the State of interest. FIG. 1, for example, illustrates a block diagram of a plate synthesis workflow 1. In the prior art configuration shown in FIG. 1, a blank license plate image is shown, which is provided to a text overlay module 5. Rendering effects 13 (e.g., font, spacing, layout, shadow/emboss, etc.) are also provided to the text overlay module 5, along with output from a character sequence generation module 7. Examples of character sequence generation data are shown in box 9 to the right of the character sequence generation module. State rules 15 for valid sequences can also be provide as input to module 7. License plate images 11 are output from the text overlay module 5. An image distortion model, which includes color-to-IR conversion, image noise, brightness, geometric distortions, etc., can be also fitted on synthesized images to mimic the impact of capturing vehicle plate images with a real video camera system.

Figure 2:
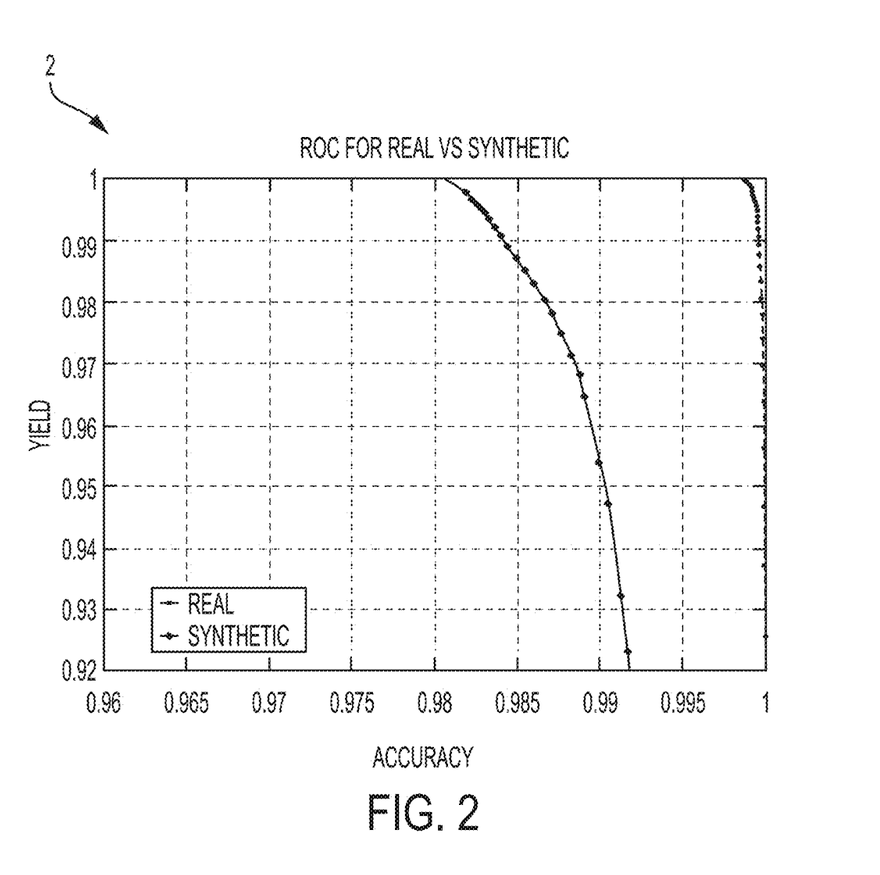
FIG. 2, for example, illustrates a prior art graph of accuracy-yield curves for classifiers trained using only synthetic and real images.

While such methods can eliminate manual interference required for training, they usually result in deterioration in the classification accuracy. FIG. 2, for example, illustrates a graph 2 of accuracy-yield curves for classifiers trained using only synthetic (green curve) and real images (red curve). In the example graph 2 of FIG. 2, even though 2000 synthetic images are used per character in training, the accuracy at the same yield is lower when classifiers are trained with 1500 real samples per character.

While these methods eliminate manual interference required for training, they usually result in deterioration in the classification accuracy. What is needed is a solution that minimizes manual annotation required for training classifiers while having minimal/no impact on the classification accuracy.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved ALPR methods and systems.

It is another aspect of the disclosed embodiments to provide for annotation free license plate recognition methods and systems.

The aforementioned aspects and other objectives and advantages can now be achieved as described herein. Methods and systems for recognizing a license plate character are disclosed. In an offline training phase, a step or operation can be implemented for generating synthetic license plate character images for a target jurisdiction. Also in an offline training phase, a step or operation can be implemented for capturing a limited set of license plate images for a target jurisdiction utilizing an image-capturing unit and thereafter segmenting the license plate images into license plate character images for the target jurisdiction. Additionally, in an offline training phase, the license plate character images collected for the target jurisdiction can be manually labeled.

Also in an offline training phase, a step or logical operation can be implemented for applying a domain adaptation method to reduce the divergence between the synthetically generated and manually labeled target jurisdiction image sets. Additionally, in an offline training phase, a step or operation can be implemented for training a set of OCR classifiers using the images after the domain adaptation method has been applied. In an online classification phase, a step or logical operation can be provided for receiving at least one input license plate character image from the target jurisdiction. The trained OCR classifier can be employed to determine the most likely labeling for the character image and a confidence associated with the label.

The disclosed embodiments thus attempt to minimize manual annotation required for training an OCR engine in an ALPR system. In the offline phase, either artificially generated synthetic license plate images or character samples acquired by OCR engines already trained in an operating system can be utilized. Training the OCR engine using character samples that are different from the images acquired from the actual camera capture site causes a mismatch between training and target data distributions, which causes deterioration in the OCR performance in the field. In order to improve the OCR performance and match training and target data distributions, an unsupervised domain adaptation can be applied via subspace and dictionary learning.

In the domain adaptation, a set of labeled samples can be employed for each character from the training set and a set of unlabeled character samples acquired from the actual camera site. The unlabeled character samples can be extracted using the generic license plate localization and character segmentation modules that are typically independent of character font, license plate lay-out, etc. The domain adaptation estimates the domain shift between training and target images and generates a shared feature representation across training and target samples. One-vs-all classifiers for the OCR engine are trained using the shared feature representation space. The present inventors have conducted experiments on artificially generated and actual character samples collected, which demonstrate the efficiency of the disclosed approach.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Automated license plate recognition (ALPR) is a key capability in transportation imaging applications including tolling, enforcement, and parking, among others. An important module in ALPR systems is image classification that includes training classifiers for character recognition, commonly employed after detecting a license plate in a license plate image and segmenting out the characters from the localized plate region. A classifier is trained for each character in a one-vs-all fashion using segmented character samples collected from the actual camera capture site, where the collected samples can be manually labeled by an operator. The substantial time and effort required for manual annotation of training images can result in excessive operational cost and overhead. In this paper, we propose a new method to minimize manual annotation required for training classifiers in an ALPR system.

Instead of collecting training images from the actual camera capture site, the disclosed approach utilizes either artificially generated synthetic license plate images or character samples acquired by trained ALPR systems already operating in other sites. The performance gap due to differences between training and target domain distributions is minimized using an unsupervised domain adaptation.

Figure 3:
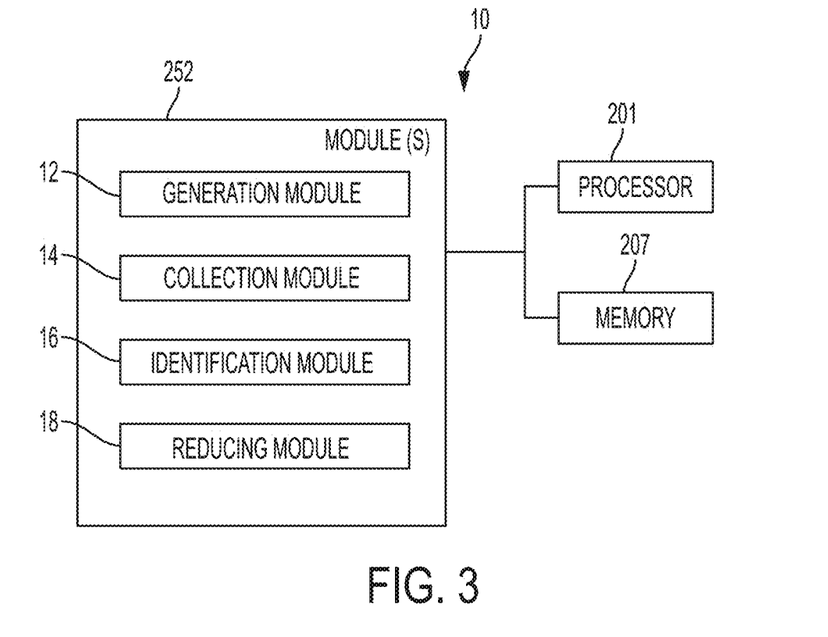
FIG. 3 illustrates a block diagram of basic components of an annotation free license plate recognition system, in accordance with a preferred embodiment.

FIG. 3 illustrates a block diagram of basic components of an annotation free license plate recognition system 10, in accordance with a preferred embodiment. The disclosed embodiments offer a new method and system that minimizes and/or eliminates manual annotation required for training classifiers in an ALPR (Automatic License Plate Recognition) system. The classifiers can be trained either using synthetically generated characters or using samples acquired by trained ALPR systems operating in other States. System 10 includes one or more module(s) 252, which can include, for example, a generation module 12 for generating synthetic images for each character using the font and layout of the State of interest along with a collection module 14 for collecting character samples from other States/countries that trained ALPR systems are operating. System 10 also includes an identification module 16 for identifying the source domain (synthetic images or samples obtained from other States) that best matches with the character samples from the State of interest (target domain). System 10 further includes a reducing module 18 for reducing divergence between the best-matched source domain and target domain to train one-vs-all classifiers. The module(s) 252 can communicate with, for example, a processor 201 and a memory 207, as discussed in greater detail herein with respect to FIGS. 6 and 7.

The use of such modules reduces the time and effort required for gathering images and training OCR engine in deployment of ALPR systems in new jurisdictions. The disclosed embodiments also can significantly reduce deployment costs while rendering the training investment more predictable.

The generation module 12 generates synthetic images for each character. The synthetic images can be generated following the methodology described in Ref. 2. The collection module 14 collects character sample other States/countries that trained ALPR systems are operating. That is, automated license plate recognition systems have already been operating in several states and countries. Thus, already operating ALPR systems provide an opportunity to collect training samples for deployments in new jurisdictions. Character images collected from CA or NY, for example, may be used as training images for a deployment in a new jurisdiction.

The identification module 16 identifies the source domain (synthetic images or samples obtained from other States) that best matches with the character samples from the State of interest (target domain). After collecting/generating training images from various source domains (i.e., creating synthetic images and collecting samples from other jurisdictions), the next challenge is to determine which source domain to use in training to achieve the best performance when classifiers are tested on target domain samples. Ideally, this question can easily be answered if there were time and resources to collect labeled test samples from the target domain on which classifiers trained by different source domain samples are tested and the best one is picked. But collecting labeled samples from target domain (new jurisdiction) is time consuming and costly. Alternatively, the best source domain can be determined based on the similarity between the source and target domains, which can be determined based on their distributions or domain shifts between the source and target domains.

The reducing module 18 can be implemented for applying domain adaptation between the best-matched source domain and target domain to train one-vs-all classifiers. Once the best source domain is selected, domain adaptation is applied to match the distributions of source and target domains. If labeled samples are only available in the source domain, an unsupervised domain adaptation technique using manifold learning or subspace interpolation via dictionary learning can be employed. If some labeled samples are also available in the target domain, a semi-supervised domain adaptation technique based on metric learning can be employed. In any case, applying domain adaptation between source and target domains reduces the divergence between two domains.

The present inventors have tested the performance of the disclosed embodiments to demonstrate the benefit and feasibility of the invention. In one experiment, CA plates were used and 2500 real samples collected for each character. 2000 synthetic images were also generated per character using the methodology described in, for example, "Image simulation for automatic license plate recognition," Bala, Raja, et al. *IS&T/SPIE Electronic Imaging*. International Society for Optics and Photonics, 2012, which is incorporated herein by reference. 1500 out of 2500 real sample per character can be used, for example, to train the classifier and the rest 1000 samples are used for testing. The images can be scaled to 48×24 before feature extraction.

HOG features were extracted and linear SVM classifiers trained in a one-vs-all fashion for each character for both synthetic and real images. After feature extraction applied adaptation was applied using subspace interpolation via dictionary learning on source and target domains.

Figure 4:
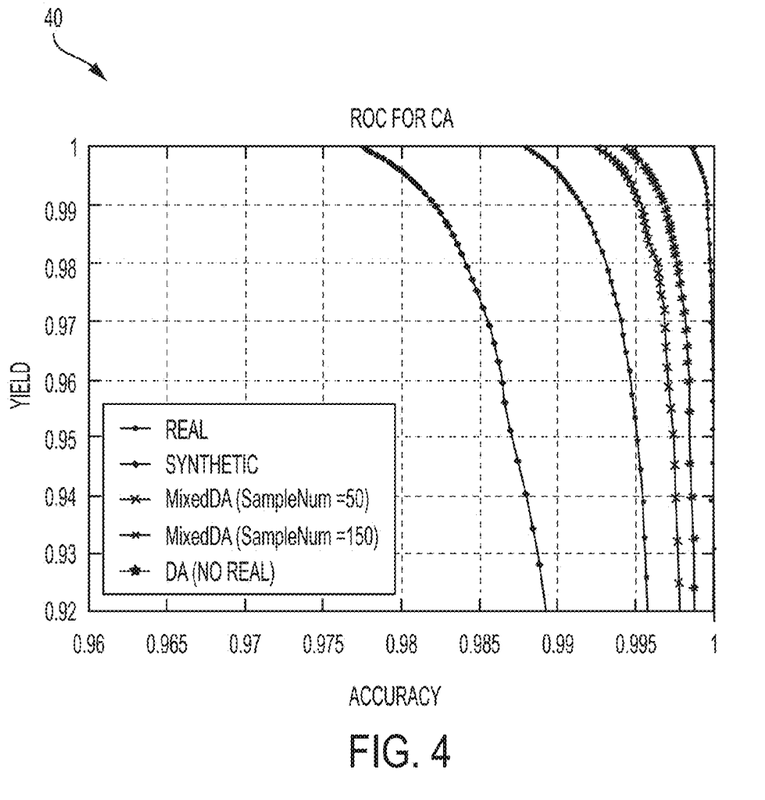
FIG. 4 illustrates a graph depicting accuracy-yield curves for training SVM classifiers using synthetic and real images, in accordance with an alternative embodiment.

FIG. 4 illustrates graph 40 depicting accuracy-yield curves for training the SVM classifiers using synthetic (green curve) and real images (red curve), in accordance with an alternative embodiment. In the example of graph 40, applying domain adaptation on source (synthetic) and target (real) domains improves the performance (cyan curve). Including some target domain samples in training along with applying domain adaptation further improves the performance (blue and magenta curves).

In order to validate results, further, another experiment was performed on NY plates. In this case, CA images were employed as the source domain and NY images as the target and the first experiment was then repeated.

Figure 5:
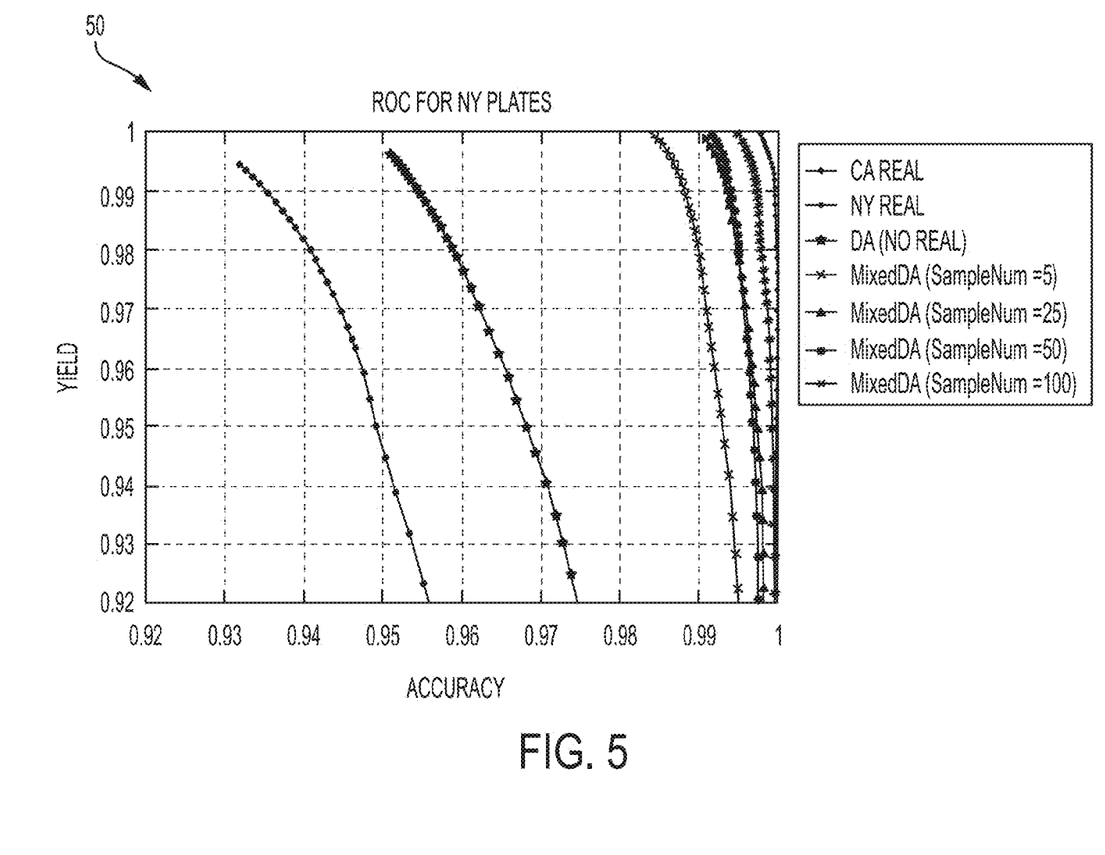
FIG. 5. illustrates a graph depicting the accuracy-yield curves for training the SVM classifier using CA images and NY images for NY plates, in accordance with an alternative embodiment.

FIG. 5 illustrates a graph 50 depicting the accuracy-yield curves for training the SVM classifier using CA images (red curve) and NY images (green curve) for NY plates. Applying domain adaptation on source and target domains improves the performance (cyan curve). Including some target domain samples in training along with applying domain adaptation further improves the performance (blue, black, yellow, and magenta curves).

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server orage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network, e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the function/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
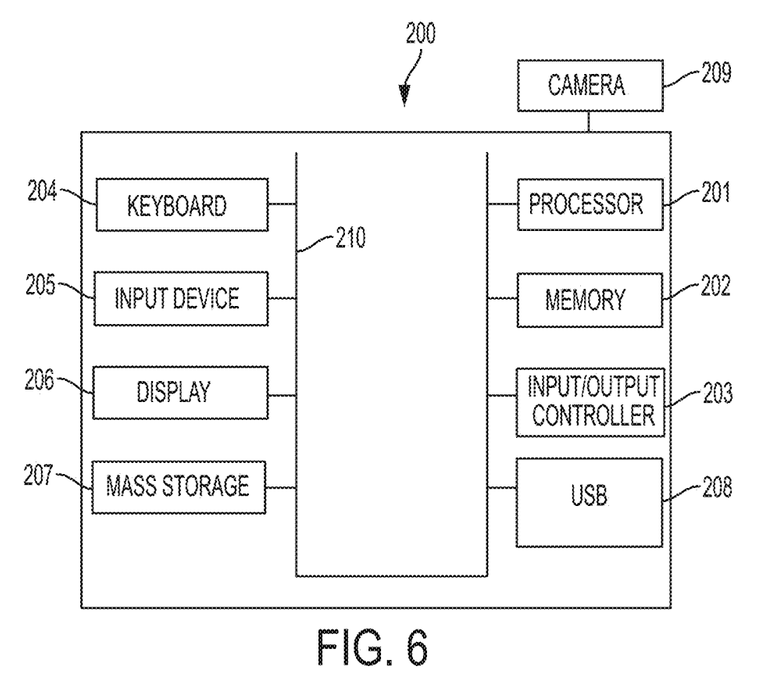
FIG. 6 illustrates a schematic view of a computer system, in accordance with an embodiment.
Figure 7:
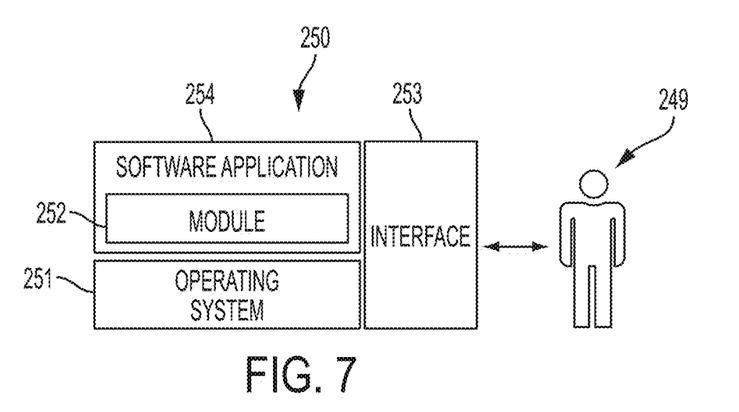
FIG. 7 illustrates a schematic view of a software system including a module, an operating system, and a user interface, in accordance with an embodiment.

FIGS. 6-7 are shown only as exemplary diagrams of data-processing environments in which embodiments may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 200 that can include one or more processors such as processor 201, a memory 202, an input/output controller 203, a peripheral USB—Universal Serial Bus connection 208, a keyboard 204, an input device 205 (e.g., a pointing device such as a mouse, track ball, pen device, etc.), a display 206, and in some cases, mass storage 207. In some embodiments, the system 200 can communicate with a rendering device, such as, for example, an image-capturing unit 209 (e.g., camera) that captures images in, for example, an ALPR system.

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may be, for example, a standalone desktop computer, a laptop computer, a Smartphone, a pad computing device, and so on.

FIG. 7 illustrates a computer software system 250 for directing the operation of the data-processing system 200 depicted in FIG. 6. The software application 254, stored for example in memory 202, generally includes a kernel or operating system 251 and a shell or interface 253. One or more application programs, such as software application 254, may be "loaded" (i.e., transferred from, for example, mass storage 207 or other memory location into the memory 202) for execution by the data-processing system 200. The data-processing system 200 can receive user commands and data through the interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module(s) 252 that can, for example, implement instructions or operations such as those shown in FIG. 3 and FIG. 8 herein. In some example embodiments, module 252 may function as an image-processing module.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, a module can be implemented to, for example, implement the instructions shown in FIG. 8.

FIGS. 6-7 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 8:
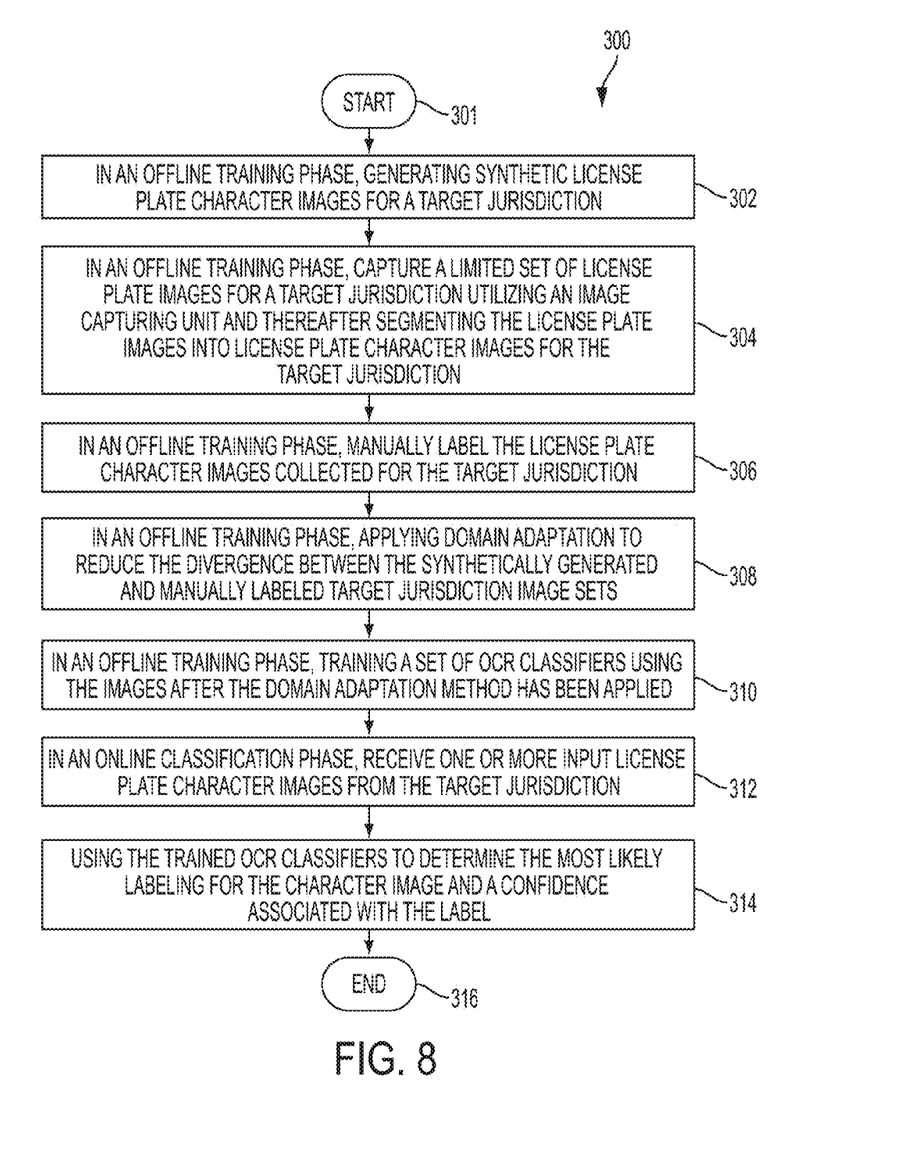
FIG. 8 illustrates a high-level flow chart of operations depicting logical operations of a method for annotation free method for recognizing a license plate character, in accordance with a preferred embodiment.

FIG. 8 illustrates a high-level flow chart of operations depicting logical operations of a method 300 for annotation free method for recognizing a license plate character, in accordance with a preferred embodiment. As indicated at block 301, the process can be initiated. Thereafter, as shown at block 302, a step or operation can be implemented in an offline training phase for generating synthetic license plate character images for a target jurisdiction.

Next, as described at block 304, a step or operation can be processed in an offline training phase for capturing a limited set of license plate images for a target jurisdiction utilizing an image-capturing unit (e.g., camera 209 shown in FIG. 6) and thereafter segmenting the license plate images into license plate character images for the target jurisdiction. Then, as indicated at block 306, in an offline training phase, a step or operation can be provided for manually labeling the license plate character images collected for the target jurisdiction. Thereafter, as depicted at block 308, in an offline training phase, a step or operation can be implemented for applying a domain adaptation method to reduce the divergence between the synthetically generated and manually labeled target jurisdiction image sets.

As indicated previously, in the domain adaptation, a set of labeled samples can be employed for each character from the training set and a set of unlabeled character samples acquired from the actual camera site. The unlabeled character samples can be extracted using the generic license plate localization and character segmentation modules that are typically independent of character font, license plate lay-out, etc. The domain adaptation estimates the domain shift between training and target images and generates a shared feature representation across training and target samples.

Next, as depicted at block 310, in an offline training phase, a step or logical operation can be provided for training a set of OCR classifiers using the images after the domain adaptation method has been applied. Then, as illustrated at block 312, in an online classification phase, a step or operation can be provided for receiving at least one input license plate character image from the target jurisdiction. Thereafter, as described at block 314, a step or operation can be implemented for using the trained OCR classifiers to determine the most likely labeling for the character image and a confidence associated with the label. The process then ends, as shown at block 316.

The disclosed embodiments address the issue of minimizing manual annotation and data collection required for the scalability of ALPR systems in new jurisdictions/countries. When an OCR engine is trained using either artificially generated synthetic images or character samples acquired from other sites, the OCR performance in the field is degraded due to the mismatch between training and target data distributions. An unsupervised domain adaptation estimates the domain shift between training and target domains and improves the OCR performance without requiring manual annotation in new deployments. The estimated domain shifts between target and multiple source domains enable to select the domain that yields the best OCR performance.

It is important to keep in mind that digit character images obtained from artificially generated license plates and from actual camera capture site seem similar. That is, even though synthetic character images look similar to actual images in general, the distortion can be quite broad in the real images which is hard to model and estimate in the synthetic image generation process. The slight difference between synthetic and real character images in terms of camera distortion causes a mismatch between distributions of synthetic and real images. As indicated previously, when OCR classifiers are trained using synthetic images, a notable performance loss is observed in the recognition accuracy due to this mismatch.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for recognizing a license plate character, said method comprising:
    applying a domain adaptation in at least one offline training phase to reduce a divergence between synthetic license plate character images that are synthetically generated and license plate character images manually labeled for a target jurisdiction;
    training in said at least one offline training phase a set of OCR classifiers using said license plate character images after said domain adaptation has been applied;
    receiving in an online classification phase at least one input license plate character image from said target jurisdiction; and
    determining a most likely label for a character image and a confidence associated with said label utilizing said trained OCR classifiers, thereby minimizing manual labeling required for training an OCR engine in a license plate recognition system.

2. The method of claim 1 further comprising generating in said least one offline training phase said synthetic license plate character images for said target jurisdiction.

3. The method of claim 1 further comprising manually labeling in said at least one offline training phase said license plate character images collected for said target jurisdiction.

4. The method of claim 1 further comprising:
    capturing in said at least one offline training phase a limited set of license plate images for said target jurisdiction, said limited set of license plates images captured utilizing an image capturing unit.

5. The method of claim 4 further comprising:
    thereafter segmenting license plate images among said limited set of license plate images into license plate character images for said target jurisdiction.

6. The method of claim 1 wherein said applying said domain adaptation in said at least one offline training phase to reduce said divergence further comprises: reducing said divergence between a best-matched source domain and a target domain to train one-versus-all classifiers, wherein said target jurisdiction comprises said target domain and said best-matched source domain includes said synthetic license plate character images.

7. The method of claim 6 further comprising: determining said best-matched source domain based on a similarity between a source domain and said target domain based on at least one of a distribution or a domain shift between said source domain and said target domain.

8. The method of claim 1 wherein said domain adaptation comprises an unsupervised domain adaptation if labeled samples are only available in a source domain and wherein said domain adaptation comprises a semi-supervised domain adaptation based on metric learning if some of said labeled samples are also available in a target domain, said target domain comprising said target jurisdiction.

9. The method of claim 8 wherein said image capturing unit comprises an automated license plate recognition camera.

10. A method for recognizing a license plate character, said method comprising:
    in an offline training phase, generating synthetic license plate character images for a target jurisdiction;
    in an offline training phase, capturing a limited set of license plate images for a target jurisdiction utilizing an image capturing unit and thereafter segmenting said license plate images into license plate character images for said target jurisdiction;
    in an offline training phase, manually labeling said license plate character images collected for said target jurisdiction;
    in an offline training phase, applying a domain adaptation to reduce the divergence between said synthetically generated and manually labeled target jurisdiction image sets;

in an offline training phase, training a set of OCR classifiers using said images after said domain adaptation has been applied;

in an online classification phase, receiving at least one input license plate character image from said target jurisdiction; and utilizing said trained OCR classifiers to determine a most likely labeling for said character image and a confidence associated with said label, thereby minimizing manual labeling required for training an OCR engine in a license plate recognition system.

11. The method of claim 10 wherein said limited set of license plate images is captured utilizing an image capturing unit.

12. The method of claim 10 wherein said image capturing unit comprises an automated license plate recognition camera.

13. A system for recognizing a license plate character, said system comprising:

at least one processor; and a non-transitory computer-usable medium embodying computer program code, said non-transitory computer-usable medium capable of communicating with said at least one processor, said computer program code comprising instructions executable by said at least one processor and configured for:

localizing a candidate region from regions of interest with respect to a tag and a tag number shown in regions of interest within a side image of a vehicle captured by said at least one camera;

applying a domain adaptation in said at least one offline training phase to reduce a divergence between a synthetic license plate character image synthetically generated and license plate character images manually labeled for a target jurisdiction;

training in said at least one offline training phase, a set of OCR classifiers using said license plate character images after said domain adaptation has been applied;

receiving in an online classification phase at least one input license plate character image from said target jurisdiction; and determining a most likely labeling for a character image and a confidence associated with said label utilizing said trained OCR classifiers, thereby minimizing manual labeling required for training an OCR engine in a license plate recognition system.

14. The system of claim 13 wherein said instructions are further configured for generating in at least one offline training phase said synthetic license plate character images for said target jurisdiction and wherein said domain adaptation estimates a domain shift between target images of said target jurisdiction and training images and generates a shared feature representation across target samples of said target jurisdiction and said training samples.

15. The system of claim 13 wherein said instructions are further configured for manually labeling in said at least one offline training phase said license plate character images collected for said target jurisdiction.

16. The system of claim 13 wherein said instructions are further configured for capturing in said at least one offline training phase a limited set of license plate images for said target jurisdiction.

17. The system of claim 16 wherein said instructions are further configured for thereafter segmenting license plate images among said limited set of license plate images into license plate character images for said target jurisdiction.

18. The system of claim 16 wherein said limited set of license plate images is captured utilizing an image capturing unit that is operably connected to said at least one processor.

19. The system of claim 13 wherein said instructions are further configured for:

capturing in said at least one offline training phase a limited set of license plate images for said target jurisdiction; and thereafter segmenting license plate images among said limited set of license plate images into license plate character images for said target jurisdiction.

20. The system of claim 19 wherein said limited set of license plate images is captured utilizing an image capturing unit.

* * * * *